United States Patent [19]

Wilson et al.

[11] 4,055,830

[45] Oct. 25, 1977

[54] SONIC MEASURING SYSTEM

[75] Inventors: Wallace C. Wilson, Vancouver, Wash.; Ralph W. Shoemaker, Portland, Oreg.

[73] Assignee: The United States of America as represented by the Secretary of the Interior, Washington, D.C.

[21] Appl. No.: 705,362

[22] Filed: July 14, 1976

[51] Int. Cl.² ............................................. G01S 11/00
[52] U.S. Cl. ................................. 340/16 R; 340/1 C; 343/112 D
[58] Field of Search ............................ 340/1 C, 16 R; 343/112 D

[56] References Cited

U.S. PATENT DOCUMENTS

| 684,706 | 10/1901 | Mundy | 343/112 D |
|---|---|---|---|
| 3,076,519 | 2/1963 | Alsabrook | 340/1 C X |
| 3,528,053 | 9/1970 | Rubin | 340/1 C X |
| 3,566,348 | 2/1971 | Leyden et al. | 340/16 R |
| 3,745,517 | 7/1973 | Sochard | 340/1 R |
| 3,757,285 | 9/1973 | Ferre | 340/1 C |

Primary Examiner—Richard A. Farley
Attorney, Agent, or Firm—Thomas Zack; Donald A. Gardiner

[57] ABSTRACT

A distance measuring system which utilizes sound waves. The first unit can be separate or combined radio transmitter and sound sensor which is held at one of the two points between which the distance is to be measured. This sound sensor unit also has a radio receiver in it. At the other point there is a second unit. This second unit combines both a radio receiver and sound source. In addition there is distance indicating circuitry in the first unit which counts pulses corresponding to distance, and then visually displays the total number of pulses as a measured distance between points based upon the known speed of sound in air at a specific temperature. Initially, the radio transmitter emits a fixed frequency carrier wave which simultaneously triggers the sending by the sound source of a low frequency sound wave and the starting of a counter in the sound sensor. Since the radio wave is traveling at the speed of light its travel speed can be considered infinite when compared to the much slower traveling sound wave. When the slower sound wave is received by the sound sensor unit it is detected, amplified, filtered, changed to a dc electrical signal, differentiated, and acts as a stop pulse for the counter. The accumulated number of pulses, corresponding to the distance between sound source and sensor, is then displayed.

8 Claims, 5 Drawing Figures

SONIC MEASURING SYSTEM

BACKGROUND OF THE INVENTION

1. Field of the Invention

Our invention is a unidirectional distance measuring system which operates by transmitting and receiving both radio and low frequency sound waves between two points.

2. Description of the Prior Art

Many prior art inventions use the simultaneous transmission of sound and radio waves to measure distances between points. Most, such as sonar, depend on receiving reflected sound waves back from a surface. Our invention is not concerned with these types of systems which depend on receiving reflected sound since it measures the distance in one direction only. Of the known prior art the U.S. Pats. Nos. 1,126,095 to Schiessler, 1,138,013 Phinney, 3,731,273 and Hunt appear closest to our invention. Each, however, differs in several important aspects. The Schiessler invention does not operate over land without intervisibility by sending a substantially fixed amplitude sound wave of low frequency as the measuring phenomenon. Phinney's system depends on the judgment of the operators to a large degree and employs no specific audio or radio frequencies. In Hunt's invention the triangulation method with two microphones or a spark gap is needed. Further, in the Hunt system the position of the electrical signal generator is critical to its operation. Such is not the case with our invention as the distance being measured is to a large degree completely independent of the location of the sound and radio wave source or its receiver.

Our invention was primarily developed to measure distances between two points in cases where there was a lack of intervisibility between observers located at these points. A good example of its use can be found in measuring lateral distances from the center line rights of way for high power transmission lines in the dense forests of the Pacific Northwest. In such an environment direct line of sight devices cannot be used because of the lack of intervisibility. High frequency sound waves have also proven unsuitable as they are affected to a large degree by the dense growth between observers. Using measuring tapes is also unacceptable due mainly to the time element in making the measurements. What we have invented overcomes all of these restrictions and drawbacks and yet is nonaffected by environmental conditions such as rain, fog, darkness or the like. It is also so simple to operate that even untrained nontechnical personnel can achieve accurate results.

SUMMARY OF THE INVENTION

The distance measuring system forming this invention has a sound source, a sound sensor, a radio transmitter and radio receivers contained in the sound source and sensor units. Initially the radio transmitter sends out a fixed frequency signal to simultaneously trigger the sound source and start a counter in the second sensor. Upon being triggered the sound source emits a low frequency (under 2,000 hertz) sound wave in the direction of the sound sensor. At the sound sensor the radio receiver receives the transmitted radio wave and triggers the running of a self contained electronic counter which counts the oscillations of a temperature calibrated, precision oscillator. This counter continues to run until the sound wave arrives at which time it stops running. The total count then directly indicates a distance whose value is dependent on the speed of sound. Lastly, the value is displayed by a readout unit in the sensor unit.

The primary object of this invention is an improved distance measuring system which employs both radio and sound waves.

Figure 1:
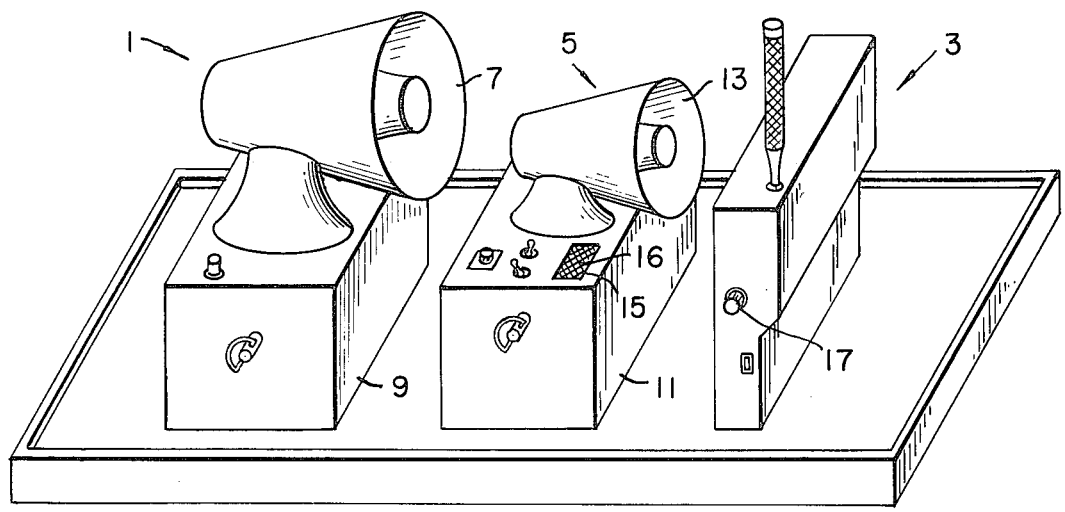
FIG. 1 is a side view of the three main units making up the system.

Before describing the specific components in detail the theory of their operation and interaction should be explained. At the first point from which the measurements are to be made the operator has the sound sensor unit and transceiver units. Separated therefrom by the distance to be measured is the second operator with a sound source unit having an internal radio receiver. Initially, the radio transceiver unit is activated to trigger both the sound source and sound sensor. This is done by transmitting a specific radio frequency whose travel time for all practical purposes may be considerated instantaneous. When the radio wave actuates the sound source it emits a 600 Hertz tone burst for about one half second. Simultaneous with the initiation of this sound wave the same radio wave triggers a counter to count a gated oscillator running in the sound sensor unit. Since the distances we intend our invention to operate in are extremely short compared to the speed of light ($2.997925 \times 10^{10}$ cm/sec. in a vacuum) at which the radio wave is traveling, the two triggering events by the radio wave can be said to occur simultaneously. In the sound sensor unit a precision, temperature calibrated oscillator, adjustable to oscillate at frequencies equivalent to the speed of sound in air in feet per second by a potentiometer, is then counted by an electronic, totalizing counter. When the tone from the sound source reaches the sound sensor, it is detected, amplified, filtered and differentiated to transform it into a pulse which stops the counter running. The number of counts, directly corresponding to the distance in feet between the two units, is then displayed on an electronic digital readout within the sound sensor unit. To make additional measurements the sound sensor unit is then reset and the process repeated.

Presently the emitted sound wave is a sineusoidal wave of one half second duration with a frequency of 600 Hertz and a wavelength of about 2 feet. It is being used to measure distances in the 25 to 1,000 foot range. The radio wave transmitted in conjunction therewith is a fixed frequency of 27.575 Mega Hertz as specifically assigned by the Federal Communications Commission (FCC). This frequency is in the Class D Citizens Band, and any nearby channel would work although this frequency was chosen because of lack of others transmitting on it. We anticipate that sound waves in the 200 to 2,000 Hertz range will work best with our invention. Waves with frequencies below 200 Hertz need a physically large speaker, and would require a large power consumption thus currently limiting its incorporation in a portable, lightweight unit. For comparison purposes our 600 Hertz wave consumes about 10 root mean square (rms) watts of power to achieve the necessary sound power. Above the 2,000 Hertz frequency, as the wavelength of the sound wave decreases, the problems of deflection and random echoes would become more of a serious operational factor. At the ultrasonic level the measuring accuracy of the invention would change from its goal of ± 1 percent to a totally unacceptable level due to lack of foliage penetration and detection by the operator.

FIG. 1 shows the three basic components of our system. They include the sound source unit 1, the radio transceiver unit 3, and the sound sensor unit 5. Both the sound sensor and transceiver units are normally portable battery operated units carried by one operator. The sound source, also portable and battery operated, is carried by the separated operator. Each unit is enclosed in a moisture resistant housing and, except for its radio antenna connection, is radio frequency tight to prevent unwanted interference therefrom. Both the sound sensor and the transceiver could easily be housed in a single unit. As previously mentioned the radio transceiver unit is a 27.575 Mega Hertz citizen band radio. Actually the one used was a slightly modified version of a Model C75/80G manufactured by the Commander Radio Division of Trippe Electronics of Chicago, Ill. The modifications relate to the addition of a snap action push-to-transmit switch to enable essentially instantaneous transmission at full power from its antenna, and a talk/count switch to enable transmission of an unmodulated carrier wave to avoid ambiguous triggering while still permitting normal operation of the radio transceiver in the Talk position. Besides triggering the counter in the sound sensor, the transceiver may also be used to communicate between persons in the field.

Figure 2:
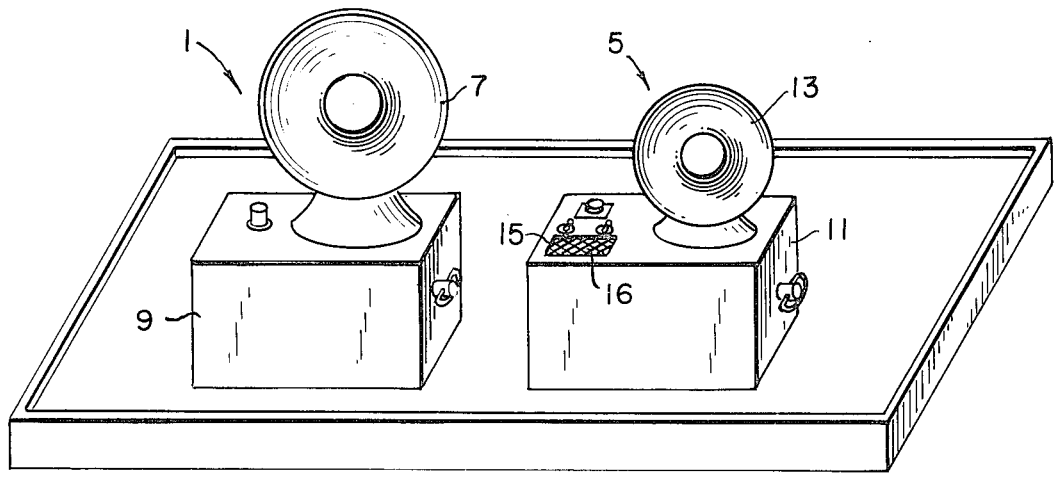
FIG. 2 depicts the sound source and sound sensor units when viewed from the front.
Figure 3:
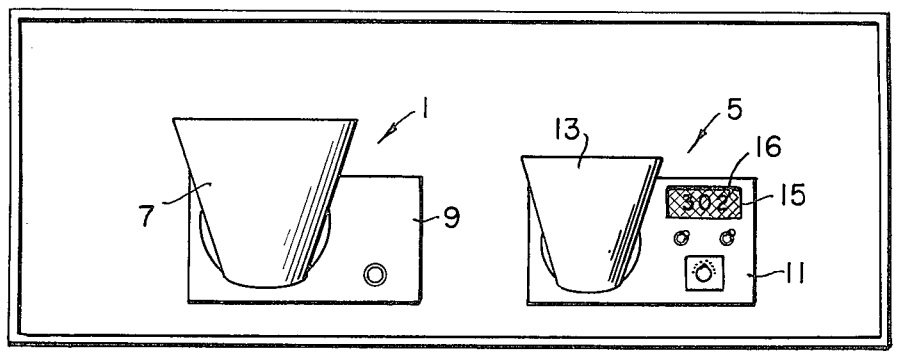
FIG. 3 is a top view of the two FIG. 2 units.

The sound source shown in FIGS. 1-3 has a large (approximately 8 inch) loud speaker 7 attached upon a rectangular housing 9. This housing contains an integrated circuit, temperature compensated 600 Hertz sine wave oscillator coupled via an electronic switch to a transistorized audio power amplifier. To actuate the electronic switch the radio receiver's output is detected by a voltage comparator and differentiated. This pulse is then used to trigger an integrated circuit timer connected as a monostable multivibrator which has an "on" time of approximately one-half second. This halfsecond pulse then closes the electronic switch electrically connecting the oscillator to the amplifier for that period of time. This circuitry sets the half second tone burst out of the sound source unit. The reason we have designed a 600 Hertz tone with a half second "on" and "off" cycle is to conserve power in this battery operated portable unit and to make the tone less objectionable to the operator. In our preferred embodiment the sound source has its own internal rechargeable battery and a separate line powered battery charger. It also contains an integrated circuit voltage regulator to supply power to the radio receiver, comparator, and timer circuits. The audio amplifier is driven directly by the battery voltage.

The portable battery operated sound sensor unit, 5, depicted in FIGS. 1-3 contains the most electronics within its rectangular housing, 11, and is the most complex of the three units. When the radio signal is received and detected it is sensed by a voltage comparator and differentiated as in the sound source unit. This pulse is then used to trigger an integrated circuit timer which delays transmittal of the pulse by approximately fifteen milliseconds. This delay is needed to compensate for the grouped delay inherent in an active filter. The next stage receives the delayed pulse corresponding to receipt of the radio signal and applies it to an integrated circuit bistable multivibrator which is then triggered to its "on" state. This "on" state closes an electronic gate allowing the frequency from the temperature calibrated oscillator to be passed to an electronic digital counter. The 600 Hertz sound signal which was simultaneously triggered by the radio transmission is sensed by a small (approximately 5 inch) paging speaker, 13, operating as a microphone. After filtering out any radio frequency content of the sound wave, the electrical representation of the audio signal is amplified by a constant amplitude amplifier (see FIG. 5). The output from this amplifier is a signal of relatively constant amplitude and is presented to the input of an active band pass filter which is tuned to the sound source's oscillation frequency of 600 Hertz. The active filter's output is rectified and filtered to convert it to a DC voltage which is directly related to the magnitude of the active filter's output signal. It is then sensed by a voltage comparator whose output is differentiated to produce a pulse corresponding to the detection of the 600 Hertz audio tone. This pulse is the "stop count pulse" which resets the bistable multivibrator to its "off" state, thus stopping the counting of the temperature calibrated oscillator by the electronic digital counter. The number of counts corresponding to the time it took the audio tone to travel from the sound source to the sound sensor unit are then displayed on the digital display, 15, and are the actual number of straight line feet between the two units. This same digital readout could easily be made to give the readout distance in meters (or other units) by a simple adjustment of the temperature calibrated oscillator so that its frequency of oscillation corresponds to the velocity of sound in air in meters (or other units) per second rather than in feet per second.

An additional feature illustrated in FIG. 3 is the electrically grounded fine mesh black screen 16 through which an operator reads the numbers on the display 15. This screen acts to prevent interference from radio waves and has the added benefit of making the numbers visually stand out better by reducing glare.

Figure 4:
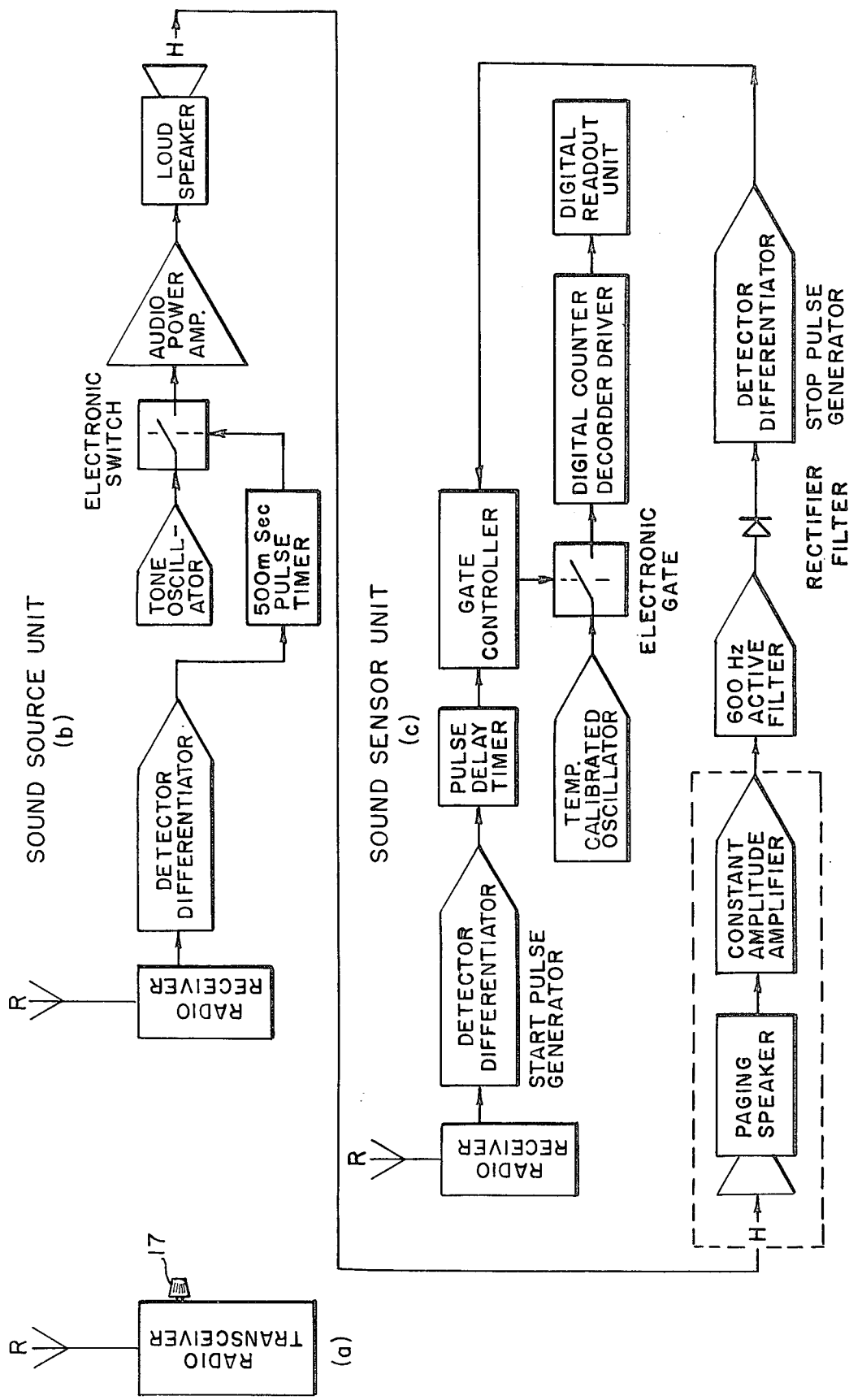
FIG. 4(a) shows the radio transceiver unit in circuit block diagram format.
FIG. 4(b) is a circuit block diagram of the sound source unit circuitry.
FIG. 4(c) is a block diagram of the sound sensor unit circuitry.

Starting with FIG. 4(a) in the preferred embodiment of radio transceiver Model C75/80G, U, made by Commander Radio Division of Trippe Electronics, Chicago, Ill. was used. It was modified by the replacement of the push-to-talk switch by a snap action, four pole double throw, momentary, push button switch 17. It was further modified by addition of a single pole, double throw slide switch which switches out the transceiver microphone as the source of modulation for the transceiver. A base loaded, whip antenna manufactured by Commander Radio was also used rather than the standard telescoping antenna to prevent breakage of the latter in harsh outdoor environment.

In FIG. 4(b), there is shown the Radio Receiver, which in the preferred embodiment was a slightly modified Heath Co., Benton Harbor, Mich., radio control receiver module. The receiver-detector circuit board only was used as it was manufactured and the output was taken off of its power detector. The digital decoder board of this receiver module was not used in the invention. When the radio signal was received, the output voltage from the Receiver, drops from its quiescent positive five volts to approximately four volts depending on the strength of the input radio signal. This voltage change was detected by a Detector/Differentiator, and differentiated to convert the Detector's output to a negative going pulse. This pulse triggers a Output Tone Duration Timer, to close an Electronic Switch, for 500 milliseconds. This allowed the 600 Hertz sine wave generated by a Tone Oscillator to be the input to a Audio Power Amplifier which amplifies and sends out an audio tone, H, by its Loud Speaker through the medium over which the distance is to be measured.

Next, in FIG. 4(c), there is shown the transmitted radio signal R from the radio transceiver unit which is received by a Radio Receiver identical to the FIG. 4(b) unit described above. Its output is detected by a Detector/Differentiator and differentiated identically as in FIG. 4(b). The resulting negative going pulse is delayed by a Pulse Delay Timer for approximately 15 milliseconds. The Delay Timer's output pulse triggers a bistable multivibrator, Electronic Gate Controller, to its "on" state allowing the square wave signal from a Temperature Calibrated Oscillator to pass through the Electronic Gate, N, to be counted by the Digital Counter. When the audio tone (sound wave), H, reaches the Paging Speaker/Sound Sensor, it is transformed into an electrical signal to be input to a Constant Amplitude Amplifier. Any radio frequency noise is filtered out of the sensed audio tone by an R.F. (radio frequency) filter at the input of the amplifier. The constant Amplitude Amplifier is described in detail in FIG. 5. The output from it is then input to a twin tee, band-pass Active Filter, whose center frequency is set at the Audio Tone frequency of 600 Hertz. This particular type of Active Filter was chosen since it has the minimum delay in its pass band and has very high selectivity. The Constant Amplitude Amplifier and Active Filter are constructed from a single integrated circuit containing four operational amplifiers of the Norton type powered by a single polarity power supply. The output from the Active Filter is Rectified and Filtered to change the 600 Hertz electrical signal to a DC voltage, and this DC voltage is detected by a Detector which is a voltage comparator whose output is differentiated to create a negative going pulse. This pulse then goes back to an Electronic Gate Controller to reset it to its "off" state thus opening the Electronic Gate and stopping the Digital Counter causing it to decode the counter output and display the distance between the Sound Source Unit and Sound Sensor Unit on the Digital Readout. Because of their action within the circuit, the Detector/Differentiator and the Detector associated with the stop pulse generator are referred to as the Start Pulse Generator and Stop Pulse Generator respectively. It is their output pulses which trigger the Electronic Gate Controller into its two states thus opening the closing the Electronic Gate, which allows the Temperature Calibrated Oscillator's output square wave to be counted. The Electronic Gate Controller is a standard transistor-transisor logic bistable multibribator (flip-flop) connected in a nonstandard configuration. Its unconditional state setting inputs alone are used to drive its output to control the Electronic Gate. Its standard frequency division or toggle functions are completely suppressed.

All of the aforementioned circuits in FIGS. 4(a)-(c) are configured from common integrated circuits including the following types: LM741, LM311, LM324, LM555, LM340, all made by National Semiconductor and others; 640-1 solid state switches made by Teledyne Relays; SN7472, SN7400, digital integrated circuits made by Texas Instruments and others; MC4050 decade counter, decoder, and display driver in one digital integrated circuit made by Motorola Semiconductor exclusively. The uniqueness of the circuitry is the result of how the designer has configured various passive elements around these integrated circuits to achieve the end result desired.

Figure 5:
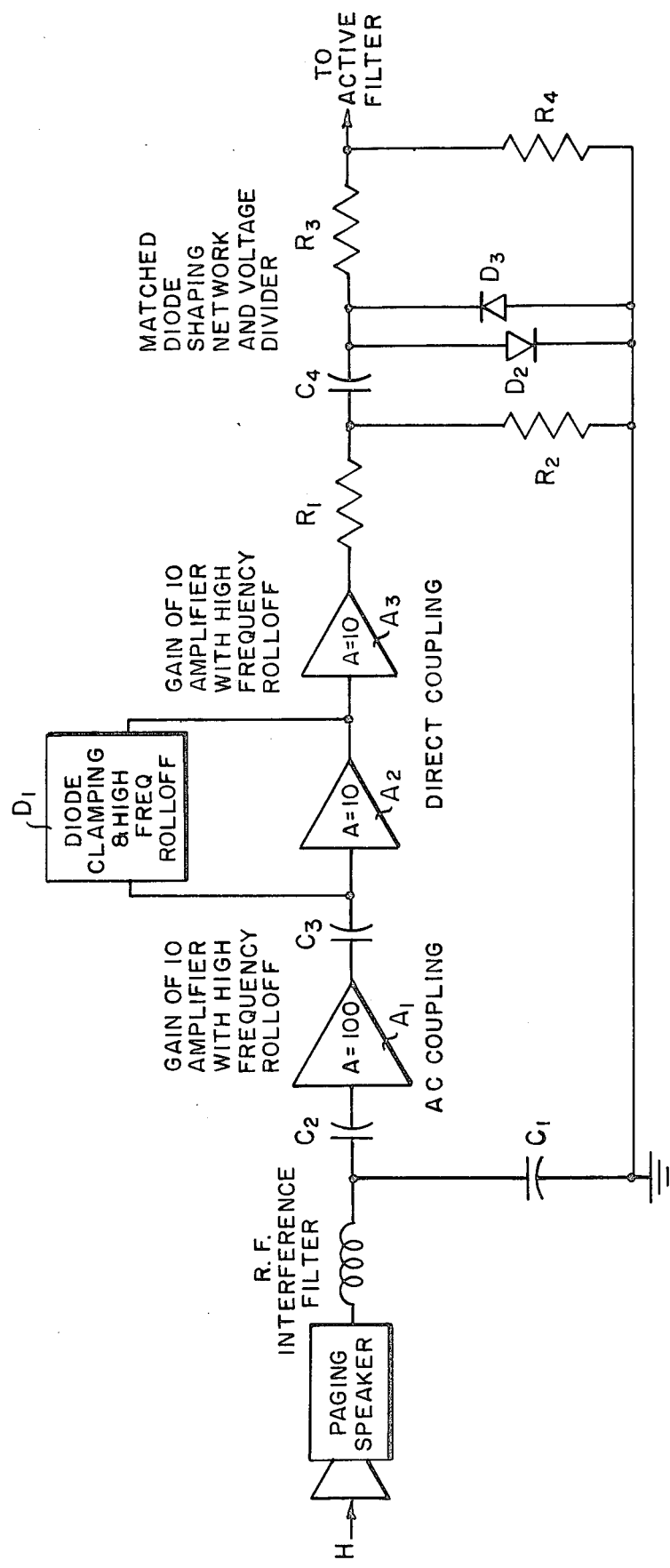
FIG. 5 illustrates the paging speaker and constant amplitude amplifier circuitry of the sound sensor unit in block format.

FIG. 5 is a breakdown in block diagram format of the constant amplitude amplifier and its associated speaker components previously shown in FIG. 4(c) and enclosed by dashed lines therein. The purpose of this amplifier is to compensate for the wide range of input signals possible —greater than 44 decibels over the range of less than 25 feet to greater than 600 feet of the instrument — and the fact that the grouped delay of an active filter varies with the amplitude of the applied signal. Without this circuit, the count start pulse delay would have to be varied with each measurement to compensate for tone amplitude variations caused by crosswinds, differing distances, and/or vegetation differences between observers. The constant amplitude amplifier is AC coupled to the paging speaker after the detected signal passes through a radio frequency (R.F.) interference filter. The amplifier has three stages of operational amplifiers (A1, A2, and A3) with diode clamping of the output of A1 to a fixed voltage (D1), resistance-capacitance feedback of out-of-range signals and noise, and resistive voltage division following more diode clamping to present the constant amplitude wave of fixed magnitude to the active filter. When incoming sound signal H is detected by the small weather resistant paging speaker and its R.F. content filtered out, it is amplified by a factor of 100 by the first amplifier stage A1. The output from this stage is then AC coupled to the second stage (A2) where it is again amplified by a factor of 10, but controlled via a feedback diode clamping and high frequency rolloff network to not exceed 0.7 volts peak-to-peak at output of A2. At the next or third stage (A3) the signal is directly (DC) coupled and amplified by a factor of 10 and outputted as a rounded square wave. It is then AC coupled to a matched diode (D2 and D3) network to clamp the signal to a fixed peak-to-peak value (+ and −0.7 volts peak-to-peak) which is then passed through a voltage divider (resistors R3 and R4). The output signal is then inputted to the operational active bandpass filter set at 600 Hertz. This signal is subjected to gain in its passband, but very little phase shift. This phaseshift and gain are constant with constant input frequency and amplitude resulting in an output signal which is fixed in time to the original tone from the sound source. This signal is then rectified, filtered, and differentiated to become the stop count pulse corresponding in time (less slight circuitry caused delay) to receipt of the 600 Hertz audio tone from the sound source unit.

It should be clear from the foregoing description that our invention was specifically designed to operate in an environment where intervisibility between observers is not possible but is not limited to that environment. By using sound waves of specific frequency ranges and radio waves as a remote triggering source having an infinite velocity we have been able to achieve a measuring distance accuracy of ± 1 percent beyond 100 feet. Not only is our invention accurate but light weight and portable with no physical connection between the sound source and sound sensor. In areas with deep underbrush and rough terrain these features are extremely valuable to survey the land by saving time and labor. Environmental conditions such as random, low level ambient noises, rain, fog, darkness and the like do not effect its operation. Its operation has shown at least a four fold reduction in cost over manual measuring by means of tape in moderate to heavy underbrush. Also, it has proved eminently workable in conditions which completely nullify the usefulness of laser, infra-red, and radar type measuring instruments.

Persons working in the electronics art will see many possible variations to the proposed disclosed circuitry. None should be used to limit our invention which is to be measured only by the claims which follow.

We claim:

1. A distance measuring system comprising:
   a sound source having means for emitting a sound wave with a fixed frequency in the lower audio range;
   a sound sensor separated from said sound source the distance to be measured for sensing the emitted sound wave, said sensor having counting means and means for displaying the distance measured between the sound source and sensor;
   a radio transmitter for simultaneously transmitting a wave of fixed frequency to both said sound source and sound sensor to trigger both the sending of the sound wave and the initiation of the counting cycle by said sensor's counting means; and
   means in said sound sensor for stopping said counting cycle when said emitted sound wave first is received thereat;
   said counted cycles being a function of said distance to be measured and displayed at said means for displaying.

2. The system of claim 1 wherein said sensor and radio transmitter are located adjacent to each other, and said sound sensor has means to delay transmission of said detected radio signal before utilizing it to gate the counting means.

3. The system of claim 1 wherein said counting means comprises a temperature calibrated oscillator and a digital counter.

4. The system of claim 1 wherein said sound source, sound sensor and radio are powered by self contained power sources.

5. The system of claim 1 including an active filter in said sound sensor and means to compensate for grouped delays in said filter.

6. A distance measuring system comprising:
   a sound source having means for emitting a sound wave with a fixed frequency in the lower audio range;
   a sound sensor separated from said sound source the distance to be measured for sensing the emitted sound wave, said sensor having counting means and means for displaying the distance measured between the sound source and sensor;
   said sound sensor comprising:
   a paging speaker adapted to output an electrical signal corresponding to the receipt of the emitted source wave from the sound source; means for preventing interference from electro-magnetic radiation caused by radio waves, said means being connected to the output of said paging speaker; a constant amplitude amplifier operatively associated with said mean's output to receive and amplify the outputted electrical signal and thereby output a signal of fixed magnitude corresponding to the receipt of the sound source's emitted sound wave; an electronic active filter connected to said amplifier for receiving its output, said filter being tuned to the emitted sound frequency of the sound wave and responsive thereto to output a signal only when said emitted frequency is present; a rectifier-filter to receive the output signal from said active filter and to output a direct current voltage signal whose magnitude corresponds directly to that of the output from the active filter;
   a radio transmitter for simultaneously transmitting a wave of fixed frequency to both said sound source and sound sensor to trigger both the sending of the sound wave and the initiation of the counting cycle by said sensor's counting means; and
   means in said sound sensor for stopping said counting cycle when said emitted sound wave first is received thereat; said counted cycles being a function of said distance to be measured and displayed at said means for displaying; said means for stopping said counting cycle comprising a detector-differentiator to receive the output from said rectifier filter, said detector-differentiator acting to receive said output signal and compare it to a present voltage level and to output a stop pulse signal when said output signal from the rectifier-filter exceeds said preset level; and a temperature calibrated oscillator circuit whose output frequency is equivalent to the velocity of sound waves in air, said oscillator's signal being gated by said stop pulse signal.

7. The system of claim 6 wherein said sound sensor circuit comprises as part of said means for stopping said counting cycle:
   an electronic gate interposed between said counting circuit and oscillator which gate is controlled by said detector-differentiator to stop or pass the output signals from said oscillator; and also including electronic digital counter-decoder driver circuitry connected to said gate's output to count the number of cycles passed by said gate in the transmission time of said received sound wave from said sound source to said sound sensor.

8. The system of claim 6 wherein said sound sensor unit also comprises:
   an electronic digital display connected to the output of said decoder driver circuitry to visually display the counted cycles as decoded by said counter-decoder driver.

* * * * *